United States Patent
Bauer et al.

(10) Patent No.: US 9,587,673 B2
(45) Date of Patent: Mar. 7, 2017

(54) HYDROSTATIC PROFILED RAIL GUIDE

(71) Applicant: Schaeffler Technologies AG & Co. KG, Herzogenaurach (DE)

(72) Inventors: Wolfgang Bauer, Riegelsberg (DE); Dietmar Rudy, Kleinbundenbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/786,011

(22) PCT Filed: Feb. 27, 2014

(86) PCT No.: PCT/DE2014/200096
§ 371 (c)(1),
(2) Date: Oct. 21, 2015

(87) PCT Pub. No.: WO2014/177142
PCT Pub. Date: Nov. 6, 2014

(65) Prior Publication Data
US 2016/0069386 A1 Mar. 10, 2016

(30) Foreign Application Priority Data
Apr. 29, 2013 (DE) .................. 10 2013 207 782

(51) Int. Cl.
*F16C 29/02* (2006.01)
*F16C 32/06* (2006.01)
(Continued)

(52) U.S. Cl.
CPC ............. *F16C 29/025* (2013.01); *C22C 9/02* (2013.01); *C25D 5/10* (2013.01); *C25D 5/48* (2013.01);
(Continued)

(58) Field of Classification Search
CPC ...... F16C 29/02; F16C 29/025; F16C 29/002; F16C 32/0659; F16C 33/12; F16C 33/14; C22C 9/02
See application file for complete search history.

(56) References Cited

U.S. PATENT DOCUMENTS 3,497,272 A * 2/1970 Caubet .................... F16C 33/04
384/203
4,080,009 A * 3/1978 Marathe ................ B23Q 1/385
108/143
(Continued)

FOREIGN PATENT DOCUMENTS

DE 19648594 5/1998
DE 102006027844 1/2007
(Continued)

OTHER PUBLICATIONS

Translation of DE 102008056965.*
Translation of DE 19648594.*

*Primary Examiner* — Thomas R. Hannon
(74) *Attorney, Agent, or Firm* — Volpe and Koenig, P.C.

(57) ABSTRACT

A hydrostatic profiled rail guide, having a guide carriage (2) which is arranged on a guide rail (1) so as to be longitudinally slidable and is hydrostatically mounted on said guide rail, wherein the guide carriage has pressure pockets and pocket surfaces arranged around the pressure pockets, and wherein the guide rail on the faces thereof facing towards the pressure pockets has rail running surfaces (7) for hydrostatic mounting of the guide carriage on the guide rail, wherein the pocket surfaces formed on the guide carriage have a first coating formed of a Cu/Sn alloy.

13 Claims, 3 Drawing Sheets

(51) Int. Cl.
*C22C 9/02* (2006.01)
*C25D 5/10* (2006.01)
*C25D 5/48* (2006.01)
*C25D 7/10* (2006.01)
*F16C 29/00* (2006.01)
*F16C 33/12* (2006.01)
*F16C 33/14* (2006.01)

(52) U.S. Cl.
CPC .............. *C25D 7/10* (2013.01); *F16C 29/005* (2013.01); *F16C 32/0659* (2013.01); *F16C 33/12* (2013.01); *F16C 33/14* (2013.01); *F16C 2204/12* (2013.01)

(56) References Cited

U.S. PATENT DOCUMENTS

| | | | | |
|---|---|---|---|---|
| 4,562,122 | A * | 12/1985 | Hodes | F16C 33/12 384/276 |
| 4,830,933 | A * | 5/1989 | Hodes | B32B 15/01 204/192.15 |
| 5,971,614 | A * | 10/1999 | Kane | F16C 32/06 384/12 |
| 5,989,444 | A * | 11/1999 | Zywno | B25B 11/005 216/33 |
| 6,194,087 | B1 * | 2/2001 | Huhn | C23C 28/021 384/912 |
| 6,498,127 | B1 | 12/2002 | Niwa et al. | |
| 6,515,288 | B1 * | 2/2003 | Ryding | F16C 29/025 250/441.11 |
| 7,052,182 | B2 * | 5/2006 | Shinohara | F16C 29/025 384/12 |
| 7,922,392 | B2 | 4/2011 | Rudy et al. | |
| 2010/0129021 | A1 * | 5/2010 | Egami | F16C 9/02 384/572 |
| 2011/0268944 | A1 * | 11/2011 | Adam | F16C 9/00 428/216 |
| 2013/0216169 | A1 * | 8/2013 | Zidar | C22C 9/00 384/276 |

FOREIGN PATENT DOCUMENTS

| | | |
|---|---|---|
| DE | 102005038346 | 2/2007 |
| DE | 102008056965 | 5/2010 |
| EP | 2133580 | 12/2009 |
| GB | 2250550 | 6/1992 |

* cited by examiner

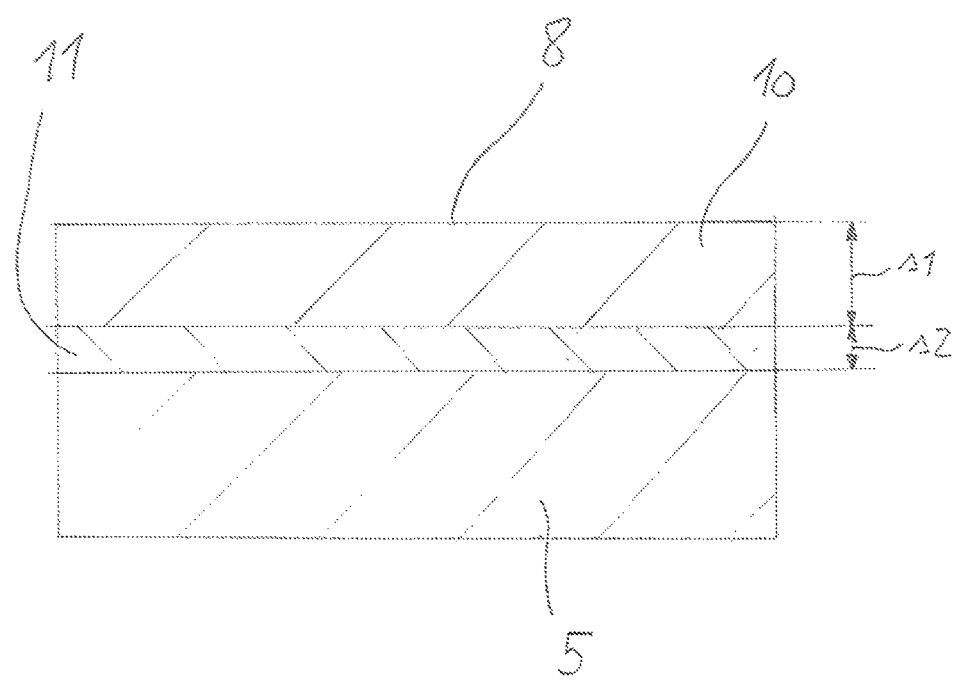

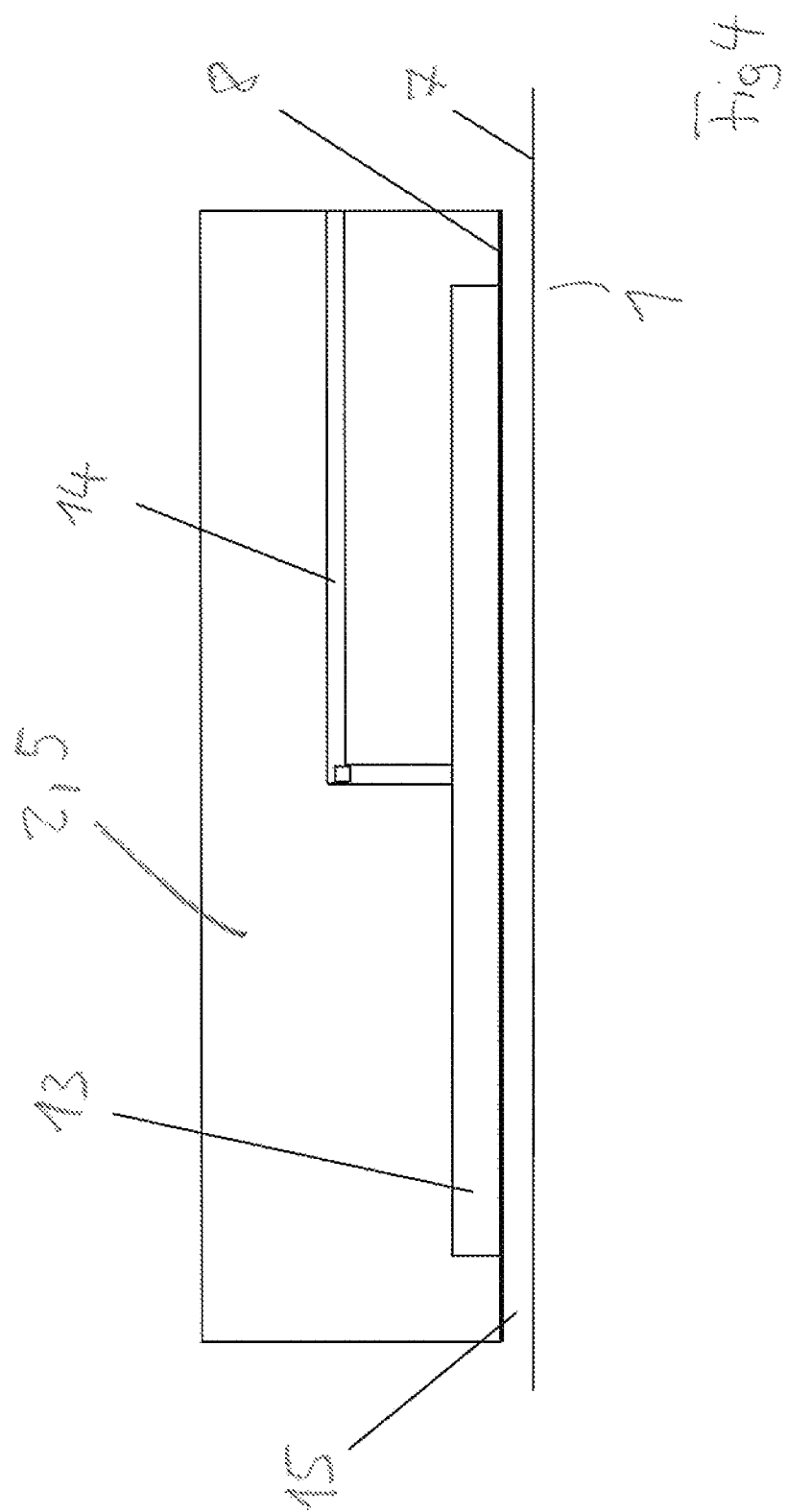

HYDROSTATIC PROFILED RAIL GUIDE

BACKGROUND

The present invention relates to a hydrostatic profiled rail guide that has a guide carriage arranged so that it can slide longitudinally on a guide rail.

From DE102005038346 A1, a hydrostatic profiled rail guide according to the prior art is known.

SUMMARY

The objective of the invention is to provide an improved hydrostatic profiled rail guide.

This objective is achieved by the hydrostatic profiled rail guide with one or more features of the invention. The pocket surfaces formed on the guide carriage are provided with a first coating that is made from a Cu/Sn alloy. It has been shown that the first coating formed only from the two components of copper (Cu) and tin (Sn) enables good properties as hydrostatic pocket surfaces. The alloy formed from these two components can include impurities with foreign substances due to production. This first coating can be deposited advantageously galvanically at high precision with the required surface quality and then ground, so that, for example, something is removed from the layer thickness of the deposited coating. Surface and layer thickness inaccuracies caused, for example, by a galvanic deposition process can be corrected by grinding.

The guide carriage of a hydrostatic profiled rail guide according to the invention has pressure pockets, around which the pocket surfaces of the guide carriage are arranged. The pocket surfaces of the guide carriage and the rail running surface of the guide rail define a hydraulic gap or bearing gap through which hydraulic fluid can flow that is provided into the pressure pockets under pressure in order to support the guide carriage hydrostatically on the guide rail. When the guide carriage is moved along the guide rail, the bearing gap remains constant.

Another advantage can be seen in that, with the hydrostatic profiled rail guide according to the invention, excellent emergency running properties are guaranteed. If the case occurs that the hydrostatic pocket pressure required for problem-free operation collapses, the bearing gap between the guide rail and the guide carriage cannot be maintained. The guide carriage can be under external loading and sit on the guide rail with its pocket surfaces. The first coating according to the invention is a tin bronze coating that has excellent sliding properties on the often ground lateral surface of the guide rail formed from steel. Consequently, to eliminate the hydrostatic pressure, an emergency running property is also guaranteed, so that the guide carriage can be moved along the guide rail.

If the Cu/Sn alloy for the first coating is made from Cu with 12 to 14 weight percent Sn, especially good emergency running properties are ensured. This alloy according to the invention can contain impurities caused by production.

For an optimum adhesion of this first coating advantageously applied galvanically on the guide carriage, it is advantageous to initially deposit a second coating made from copper on the guide carriage. The layer thickness of this second coating can be significantly thinner than the layer thickness of the first coating made from Cu/Sn.

The guide carriage of the hydrostatic profiled rail guide according to the invention has a supporting body formed from steel in one advantageous refinement and head pieces formed on the supporting body on its end faces. On the supporting body formed from steel, the pressure pockets are formed with the pocket surfaces arranged around the pressure pockets. The first coating can be deposited on a second coating made from Cu, wherein the second coating is deposited on the steel of the supporting body. In this case, the advantageously galvanically deposited second coating is used as an ideal carrier of the advantageously galvanically deposited first coating.

The coating deposited on the steel of the supporting body provides, in one construction of the invention, a layer thickness of 14 µm up to and including 16 µm. This layer thickness refers to the coating deposited on the steel of the substrate, that is, to the layer thickness of the first coating including—if present—the second coating.

The first coating made from Cu/Sn can advantageously have a layer thickness of approximately 70-80 µm. This first coating can then be ground in a grinding process until defect-free surfaces of the pocket surfaces are guaranteed, wherein these pocket surfaces are simultaneously formed as emergency running surfaces. The total layer thickness of the first and second galvanically deposited coatings is here equal to, in a refinement according to the invention, after the grinding of the first coating, a layer thickness of 14 µm up to 16 µm, wherein a total layer thickness of 15 µm is desired.

BRIEF DESCRIPTION OF THE DRAWINGS

The invention is explained in more detail below with reference to an embodiment shown in four figures. Shown are.

DETAILED DESCRIPTION OF THE PREFERRED EMBODIMENTS

Figure 1:
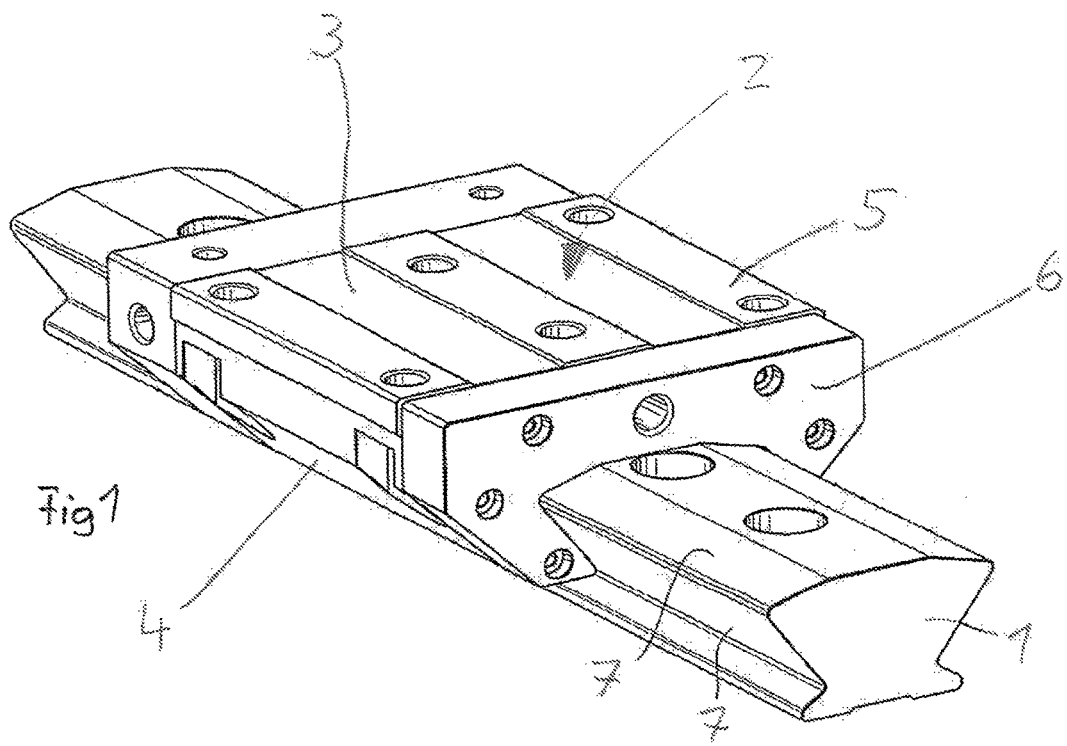
FIG. 1 a hydrostatic profiled rail guide according to the invention in perspective view, FIG. 2 a cross section through the hydrostatic profiled rail guide according to FIG. 1, FIG. 3 in a schematic diagram, a coating structure of the guide carriage of the profiled rail guide according to the invention, and FIG. 4 in a schematic diagram, a longitudinal section of a hydrostatic profiled rail guide according to the invention.

The hydrostatic profiled rail guide shown in the two figures has a guide carriage 2 guided on a guide rail 1 so that it can move longitudinally. The guide carriage 2 has a back 3 and legs 4 that are arranged on its two longitudinal sides along the guide rail 1 and with which the guide carriage 2 partially wraps around the guide rail 1.

The guide carriage 2 is made essentially from a supporting body 5 formed from steel and from two head pieces 6 arranged on the two end sides of the supporting body 5. Not-shown hoses through which hydraulic fluid is pumped are connected to the head pieces 6. The hydraulic fluid is guided via channels not shown in more detail and provided in the interior of the guide carriage 2 in order to form a hydrostatic pressurized cushion between the guide carriage and the guide rail.

FIG. 4 show, in a longitudinal section, the disclosed guide rail 1 and the guide carriage 2 supported hydrostatically on this rail. The guide rail 1 is provided with rail running surfaces 7. The supporting body 5 is provided on its sides facing the rail running surfaces 7 with pressure pockets 13 in which pressurized hydraulic fluid is provided. The hydraulic fluid is led via the pressure lines 14 into the pressure pockets 13. The pressure pockets 13 are surrounded by pocket surfaces 8 that define bearing gaps 15 together with the rail running surfaces 7.

Figure 2:
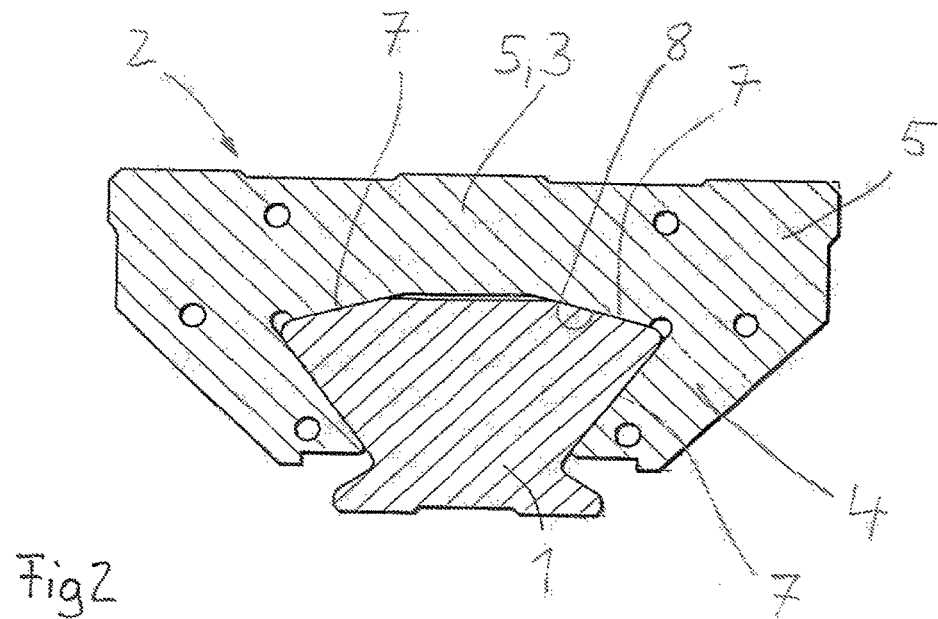

FIG. 2 shows, in cross section, the pocket surfaces 8 of the guide carriage 2 and the rail running surfaces 7 of the guide rail 1. FIG. 2 shows, in total, four rail running surfaces 7, two on the rail top side, two on the rail bottom side, and corresponding pocket surfaces 8. Of each of these pocket surfaces 8, several surfaces can be arranged one behind the other along the longitudinal axis of the guide rail 1.

Of the four pocket surfaces 8 formed on the supporting body 5 of the guide carriage 2, two are formed on the side of the back 3 facing the guide rail 1 and two are formed, one on each of the two legs 4 on its side facing the guide rail 1.

The supporting body 5 formed from steel is coated in the area of its pocket surfaces 8. FIG. 3 shows schematically the layer structure: the pocket surface 8 itself is formed by a first coating 10 that is formed from a Cu/Sn alloy. This first coating 10 is deposited galvanically on a second coating 11 made from copper. This second coating 11 is deposited galvanically on the steel of the supporting body 5.

The pressure pockets 13 and the pocket surfaces 8 are provided in the embodiment with the coatings according to the invention. Alternatively it is conceivable to cover the pressure pockets so that only the pocket surfaces 8 are coated.

The layer thickness s2 of the second coating 11 equals between 3 to 5 µm. The layer thickness s1 of the first coating 10 equals 10 to 13 µm. Both coatings together have a layer thickness of 15 µm+/−1 µm.

The total layer thickness can be significantly greater than 15 µm. In this case, the second coating is ground until a specified gap dimension between the guide carriage 2 and the guide rail 1 is set without any problems.

LIST OF REFERENCE NUMBERS

1 Guide rail
2 Guide carriage
3 Back
4 Leg
5 Supporting body
6 Head piece
7 Rail running surface
8 Pocket surface
9 -
10 First coating
11 Second coating
12 -
13 Pressure pocket
14 Pressure line
15 Bearing gap

The invention claimed is:

1. A hydrostatic profiled rail guide comprising a hydrostatically supported guide carriage arranged to slide longitudinally on a guide rail, the guide carriage includes pressure pockets and pocket surfaces arranged around the pressure pockets, and rail running surfaces are located on sides of the guide rail that face the pressure pockets for hydrostatic support of the guide carriage on the guide rail, and the pocket surfaces formed on the guide carriage are provided with a layered structure comprising a first coating formed of a Cu/Sn alloy and a second coating made from Cu, the second coating being deposited on a supporting body of the guide carriage and the first coating being deposited directly on the second coating.

2. The hydrostatic profiled rail guide according to claim 1, wherein whose Cu/Sn alloy is made from Cu with 12 to 14 weight percent Sn.

3. The hydrostatic profiled rail guide according to claim 1, wherein the first coating is deposited galvanically.

4. The hydrostatic profiled rail guide according to claim 1, wherein the first coating is an outermost layer of the layered structure such that the first coating forms an exposed portion of the pocket surfaces.

5. The hydrostatic profiled rail guide according to claim 1, wherein the first coating has a layer thickness which is greater that a layer thickness of the second coating.

6. The hydrostatic profiled rail guide according to claim 5, wherein the layer thickness of the first coating is in the range of 10-13 µm and the layer thickness of the second coating is in the range of 3 to 5 µm.

7. The hydrostatic profiled rail guide according to claim 1, wherein the supporting body is formed from steel with the pocket surfaces formed on the supporting body, wherein the second coating is deposited directly on the steel of the supporting body.

8. The hydrostatic profiled rail guide according to claim 7, wherein the first coating and the second coating together have a layer thickness from 14 µm up to and including 16 µm.

9. The hydrostatic profiled rail guide according to claim 7, wherein the second coating is deposited galvanically.

10. A method for producing a hydrostatic profiled rail guide according to claim 7, comprising galvanically depositing the second coating from copper and galvanically depositing the first coating from Cu/Sn on the second coating.

11. A method for producing a hydrostatic profiled rail guide comprising a hydrostatically supported guide carriage arranged to slide longitudinally on a guide rail, the guide carriage including pressure pockets and pocket surfaces arranged around the pressure pockets, and rail running surfaces located on sides of the guide rail that face the pressure pockets for hydrostatic support of the guide carriage on the guide rail, the method comprising: galvanically depositing a first coating formed of a Cu/Sn alloy on the pocket surfaces and then grinding the first coating in a grinding process.

12. The method according to claim 11, wherein the galvanically deposited first coating has a layer thickness that is greater than 15 µm, and the first coating is ground so that a total layer thickness of 14 µm to 16 µm is set.

13. The method according to claim 12, further comprising galvanically depositing a second coating on a supporting body of the guide carriage before the depositing of the first coating directly on the second coating, and said total layer thickness includes a layer thickness of the second coating.

* * * * *